US011526163B2

United States Patent
Cole et al.

(10) Patent No.: US 11,526,163 B2
(45) Date of Patent: Dec. 13, 2022

(54) SUBMERSIBLE INSPECTION VEHICLE WITH NAVIGATION AND MAPPING CAPABILITIES

(71) Applicant: HITACHI ENERGY SWITZERLAND AG, Baden (CH)

(72) Inventors: Gregory A. Cole, West Hartford, CT (US); William J. Eakins, Bloomfield, IN (US); Daniel T. Lasko, Bloomfield, CT (US); Harshang Shah, Ellington, CT (US); Thomas A. Fuhlbrigge, Avon, CT (US); Carlos W. Morato, St. Charles, CT (US); Luiz Cheim, Ballwin, MO (US); Poorvi Patel, West Hartford, MO (US); Biao Zhang, Hartford, CT (US); Saumya Sharma, Enfield, CT (US); Gregory F. Rossano, Enfield, CT (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 170 days.

(21) Appl. No.: 16/434,639

(22) Filed: Jun. 7, 2019

(65) Prior Publication Data
US 2019/0286119 A1 Sep. 19, 2019

Related U.S. Application Data

(63) Continuation of application No. PCT/IB2017/001631, filed on Dec. 6, 2017.
(Continued)

(51) Int. Cl.
*G05D 1/00* (2006.01)
*H04W 4/44* (2018.01)
(Continued)

(52) U.S. Cl.
CPC ......... *G05D 1/0022* (2013.01); *G05D 1/0038* (2013.01); *G05D 1/0206* (2013.01);
(Continued)

(58) Field of Classification Search
CPC .. G05D 1/0022; G05D 1/0038; G05D 1/0206; H04W 4/44; G07C 5/008; G07C 5/08
See application file for complete search history.

(56) References Cited

U.S. PATENT DOCUMENTS

| | | | |
|---|---|---|---|
| 2002/0105513 A1* | 8/2002 | Chen | G06T 15/205 345/419 |
| 2006/0008137 A1 | 1/2006 | Nagahdaripour et al. | |

(Continued)

FOREIGN PATENT DOCUMENTS

| | | |
|---|---|---|
| CN | 102362495 A | 2/2012 |
| CN | 103038761 A | 4/2013 |

(Continued)

OTHER PUBLICATIONS

Lavest, J.-M & Rives, Gérard & Lapresté, Jean-Thierry. (2003). Dry camera calibration for underwater applications. Mach. Vis. Appl. . 13. 245-253. 10.1007/s00138-002-0112-z. (Year: 2003).*
(Continued)

*Primary Examiner* — Rami Khatib
*Assistant Examiner* — Shahira Baajour
(74) *Attorney, Agent, or Firm* — Sage Patent Group (57) ABSTRACT

A submersible remotely operable vehicle used for inspection of liquid cooled electrical transformers can include a number of separate cameras and sensors for mapping and navigating the internal structure of the transformer with liquid coolant remaining in the transformer. The remotely operable vehicle can be wirelessly controlled to perform various inspection functions while the number of cameras provide video streams for processing to produce a three dimensional field
(Continued)

of view based on an observation position of the remotely operable vehicle.

11 Claims, 5 Drawing Sheets

Related U.S. Application Data (60) Provisional application No. 62/431,325, filed on Dec. 7, 2016.

(51) Int. Cl.
*G05D 1/02* (2020.01)
*G07C 5/00* (2006.01)
*G07C 5/08* (2006.01)

(52) U.S. Cl.
CPC ............... *G07C 5/008* (2013.01); *G07C 5/08* (2013.01); *H04W 4/44* (2018.02)

(56) References Cited

U.S. PATENT DOCUMENTS

| | | |
|---|---|---|
| 2011/0235702 A1 | 9/2011 | O'Connell et al. |
| 2015/0363914 A1 | 12/2015 | Boyle et al. |
| 2015/0369751 A1 | 12/2015 | Cheim et al. |
| 2016/0116912 A1 | 4/2016 | Nehmadi et al. |
| 2016/0327950 A1 | 11/2016 | Bachrach et al. |

FOREIGN PATENT DOCUMENTS

| | | |
|---|---|---|
| CN | 103153553 A | 6/2013 |
| CN | 103533313 A | 1/2014 |
| CN | 104251861 A | 12/2014 |
| CN | 104918825 A | 9/2015 |
| CN | 105026112 A | 11/2015 |
| CN | 105059506 A | 11/2015 |
| EP | 1308829 A2 | 5/2003 |
| IN | 2527MUM2009 A | 2/2012 |
| JP | 0998406 A | 4/1997 |
| JP | 10221256 A | 8/1998 |
| JP | 2010000533 A | 1/2010 |
| JP | 2011528208 A | 11/2011 |
| JP | 2012189551 A | 10/2012 |
| KR | 20120075899 A | 7/2012 |
| WO | 2014120568 A1 | 8/2014 |

OTHER PUBLICATIONS

English Translation of JPH0998406A.*
Japanese Office Action with English Translation for Japanese Patent Application No. 2019-530816 dated Sep. 8, 2020, 10 pages.
International Search Report and Written Opinion for International Application No. PCT/IB2017/001631 dated Apr. 30, 2018, 11 pages.
Notice of Grant for Japanese Patent Application No. 2019-530816 dated Sep. 7, 2021, 3 pages.
Decision of Refusal for Japanese Patent Application No. 2019-530816 dated Feb. 3, 2021, 7 pages.
Notification to Grant Patent Right for Invention for Chinese Application No. 201780085767.0, dated Apr. 13, 2022, 4 pages.
Yinan, et al, "Calculation and application of imaging track for multi-fields space camera," Changchun Institute of Optics, Fine Mechanics and Physics, Chinese Academy of Sciences, Changchun 130033, China, May 2015, 5 pages.
Michael Langford, "Royal College of Art Advanced Photography Course," China Photographic Publishing House, China, Aug. 31, 1999, 5 pages.

* cited by examiner

FIG. 6

SUBMERSIBLE INSPECTION VEHICLE WITH NAVIGATION AND MAPPING CAPABILITIES

TECHNICAL FIELD

The present invention generally relates to submersible inspection vehicles, and more particularly, but not exclusively, to vision-telemetry based autonomous navigation and mapping with submersible remotely operable vehicles to internally inspect liquid filled housings, such as electrical transformers.

BACKGROUND

Power transformers are a key component in power transformation and distribution. Large power transformers are extremely heavy, and are difficult to transport and replace. In addition, transformers have a limited life span even if not damaged, and it is necessary to periodically maintain and repair power transformers. While online monitoring, dissolved gas analysis, noise level monitoring and related technologies are often used to identify potential problems that a transformer may have, the maintenance and repair work is required to be performed on site or in a repair shop, both of which require draining of the transformer oil. Thus, physically accessing the interior of the transformer for inspection by a human can be a costly and time consuming undertaking. There are also safety and environmental considerations involved in the manual inspection, draining and refilling operations.

Therefore, the capability of inspecting the interior of a large power transformer with the cooling oil remaining in the tank is highly desired by the transformer servicing and manufacturing industry. However, internal inspection of transformers is typically possible in only limited applications, such as by using standard visual tools like borescopes for smaller size units. For medium and large power transformers, due to technical issues such as cable length and controlling the borescope, only limited internal areas of the transformer are able to be visually inspected. Thus, many transformer defects such as damage to transformer windings have to be detected by using indirect techniques, such as by analyzing temperature of the oil, detection of gasses that appear in the oil under certain conditions, and noise level, for example. Accordingly, there remains a need for further contributions in this area of technology.

SUMMARY

One embodiment of the present invention is a unique submersible remotely operable vehicle for internal inspection within a liquid filled housing and more particularly, but not exclusively, for internal inspection of an electrical transformer. Other embodiments include apparatuses, systems, devices, hardware, methods, and combinations for wirelessly navigating and three dimensional mapping an internal structure of the transformer with a submersible remotely operable vehicle. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
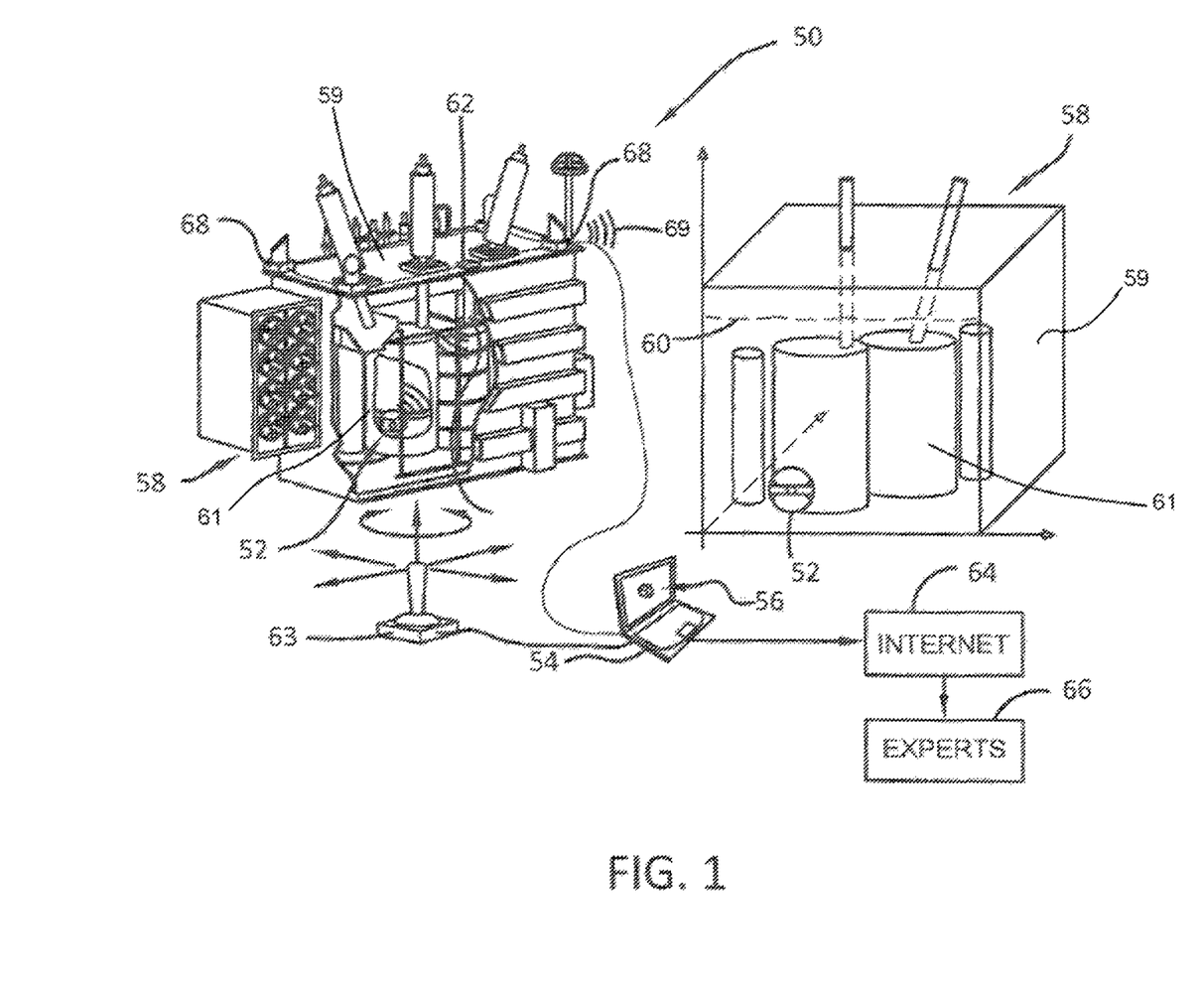
FIG. 1 depicts an embodiment of a system with a submersible remotely operable vehicle communicating with a base station.

With reference to FIG. 1, there is illustrated a system for in-situ inspection designated generally as 50. The system 50 generally includes an inspection device in the form of a submersible remotely operated vehicle (ROV) 52 which is wirelessly controlled from a control station which, in the illustrated embodiment, includes a processing device 54 such as a computer and a display 56. As used herein, the term "submersible" includes, but is not limited to, a vehicle capable of operation under the surface of a liquid body. Although much of the description that follows utilizes the term ROV for sake of consistency, it will be understood that the term ROV encompasses various embodiments described herein, including autonomous submersible robots, drones, and other devices as well, such as but not limited to those that are remotely triggered but are otherwise autonomous. Thus, the ROV 52 is intended to cover a broad range of robotic inspection devices.

Of note in FIG. 1, the system 50 includes components generally on the left and bottom side of the figure, with the components on the upper right representing a schematic model of certain aspects of the system 50 (e.g. the tank in which the ROV 52 is operating) which tank will be understood by those of skill in the art. In many forms the submersible vehicles described herein are capable of operating in a container which maintains a fluid such as a pool or chemical storage tank, but in other forms can be a sealed container such as a transformer tank. The liquid can take any variety of forms including water or oil, but other possible liquids are also contemplated. By way of example, and not limitation, internal inspection may be performed on/in portions of ship hulls, electrical interrupters, high voltage switch gears, nuclear reactors, fuel tanks, food processing equipment, floating roof storage system, chemical storage tank, or other apparatuses of similar nature.

The submersible ROV 52 shown in the illustrated embodiment is being used to internally inspect a tank 59 and the internal components 61 in tank 59 of a transformer 58, but other applications are contemplated herein. Skilled artisans will appreciate that the internal inspection typically occurs only when the transformer 58 is offline or not in use. In many embodiments the transformer 58 utilizes its liquid as a cooling fluid 60 that is confined within tank 59 along with the internal transformer components 61. Cooling fluid 60 maintains and disburses heat generated by the internal components 61 during operation of the transformer 58.

The cooling fluid 60 can be any liquid coolant contained within an electrical transformer, such as but not limited to a liquid organic polymer. Such liquid can therefore be transformer oil, such as but not limited to, mineral oil. In other forms the transformer liquid can be pentaerythritol tetra fatty acid natural and synthetic esters. Silicone or fluorocarbon-based oils can also be used. In still other forms a vegetable-based formulation, such as but not limited to using coconut oil, may also be used. It may even be possible to use a nanofluid for the body of fluid in which the robotic vehicle is operating. In some embodiments, the fluid used in the transformer includes dielectric properties. Mixtures using any combination of the above liquids, or possibly other liquids such as polychlorinated biphenyls may also be possible.

As skilled artisans will appreciate, the transformer 58 is typically maintained in a sealed configuration so as to prevent contaminants or other matter from entering. As used herein, a "sealed configuration" of the tank allows for sealed conduits and/or ducts to be associated with the transformer's tank or housing to allow for connection to the electrical components and/or monitoring devices maintained in the tank. The tank is also provided with at least one opening to allow for the filling and/or draining of the cooling fluid. As shown in FIG. 1, an opening 62 can be an existing service hole, e.g. those used for filling the transformer oil and/or those used to enter a tank upon servicing by a technician. In general operation, the oil is inserted through any number of holes located in the top of the tank. Openings 62 may also be provided at the bottom of the tank 59 to allow for the fluid to be drained. The openings 62 can be provided with the appropriate plugs or caps to seal the transformer 58. In some embodiments the opening 62 can be sized and structured such that the transformer tank top need not be unsealed completely or at all to introduce the submersible ROV 52. Accordingly, it will be appreciated that the size of the ROV 52 can be such that it can fit within a designated opening, whether the opening is the opening 62 depicted in the illustration or other types of access points discussed elsewhere herein and/or appreciated by those of skill in the art.

The ROV 52 is insertable into the transformer 58 or other tank, and is contemplated for purposes of the various embodiments herein as being movable utilizing un-tethered, wireless remote control, although tethering is not precluded. In the illustrated embodiment, the computer processor 54 (depicted as a laptop computer in the illustrated embodiment although other appropriate computer processing devices are also contemplated) is contemplated to be in wireless communication with the ROV 52. A motion control input device, such as a joystick 63 is connected to the computer processor 54 and allows for a technician to control movement of the ROV 52 inside the transformer 58. Such navigational control can be by visual awareness of the technician and/or by information made available via the display 56, such as the three dimensional mapping from the observation, a virtual model of the transformer 58). Other types of motion control input devices, such as used in video games, handheld computer tablets, computer touch screens or the like may be employed.

In some embodiments the computer processor 54 can be connected to another computer via a network, such as the depicted internet 64 as one example, so as to allow for the images or sensor data to be transferred to experts, who may be remotely located, designated by the block 66 so that their input can be provided to the technician so as to determine the nature and extent of the condition within the transformer 58 and then provide corrective action as needed. In some embodiments, control of the ROV 52 can also be transferred to an expert, who may be remotely located. In such embodiments, the expert would have another computer that can send control signals via a network to the local computer processor 54 that in turn sends signals to control the ROV 52 as described above.

The transformer 58 may be configured with a plurality of signal transmitters and/or receivers 68 mounted on the upper corners, edges or other areas of the transformer 58, or in nearby proximity to the transformer. The transmitters and/or receivers 68 are structured to send and/or receive a wireless signal 69 from the inspection device to determine the position of the inspection device in the transformer tank. It will be appreciated that in some forms the transmitter and/or receiver 68 can include any number of separate transmitter and/or receiver pairings to accommodate a similar number of transmitter and/or receivers that may be used in the ROV 52 for redundancy, some embodiments of which will be described further below. It will be appreciated given the disclosure herein that mention of transmitter and/or receiver 68 can refer to multiple separate transmitters and/or receivers that are paired with a corresponding transmitter and/or receiver on the ROV 52.

The transmitters and/or receivers 68 can be a transceiver in one embodiment, but can include a transmitter and antenna that are separate and distinct from one another in other embodiments. For example, the transmitter can be structured to send information using different frequencies/modulation/protocols/etc. than an antenna is structured to receive. Thus as used herein, the term "transmitter" and "antenna" can refer to constituent parts of a transceiver, as well as standalone components separate and apart from one another. No limitation is hereby intended unless explicitly understood to the contrary that the term "transmitter" and/or "antenna" are limited to stand alone components unless otherwise indicated to the contrary. Furthermore, no limitation is hereby intended that the use of the phrase "transmitters and/or receivers" must be limited to separate components unless otherwise indicated to the contrary.

Informational data gathered by the ROV 52, and any associated sensor, can be transmitted to the controller 76 and/or to the computer processor 54 through the fluid and the tank wall with the openings 62. Use of different communication paths for difference aspects of the operation of the ROV 52 may be used to prevent interference between the signals. Some embodiments may utilize the same communication path to transfer data related to positioning, data information, and control information as appropriate.

Figure 2:
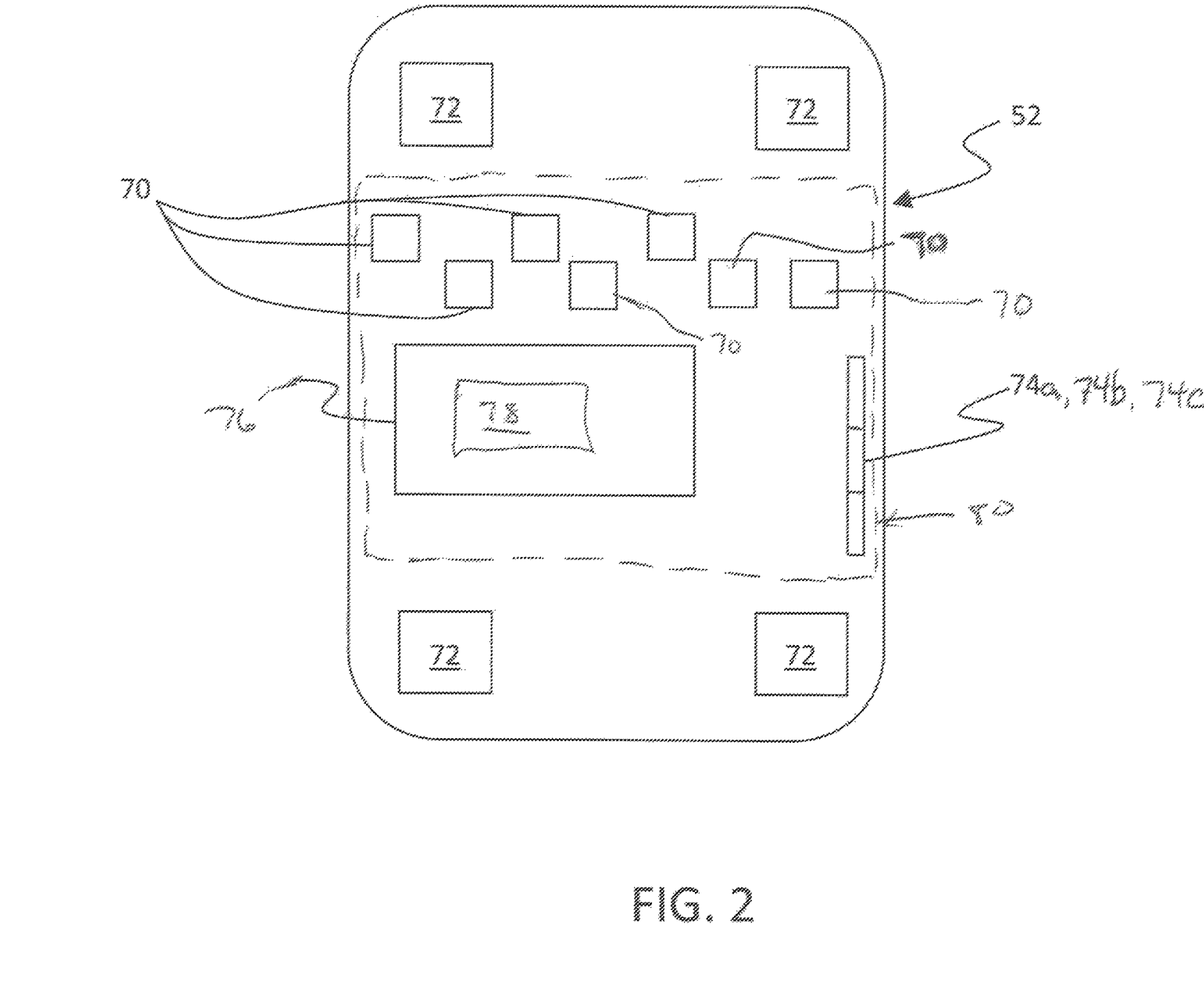
FIG. 2 depicts a schematic of one embodiment of the submersible remotely operable vehicle.

Turning now to FIG. 2, one embodiment of the ROV 52 is depicted as including a number N of cameras 70, motors 72 and transmitter and/or receivers 74a, 74b, and 74c. Other components may also be included in the ROV 52 but are not illustrated for sake of brevity (e.g. a battery to provide power to the cameras, additional sensors such as rate gyros or magnetometers, extendable arm(s) with fiber optic camera(s) for inspection in tight locations, etc.). The cameras 70 are utilized to capture video streams that image the internal components of the transformer as ROV 52 navigates the transformer 58.

In one embodiment of the ROV 52, a number N of cameras 70 are provided that are fixed in orientation and fixed relative to one another, and do not have separate mechanisms (e.g. a servo) to change their point or field of view. In other embodiments all cameras 70 of the ROV 52 have a fixed field of view and are not otherwise capable of being moved. The cameras 70 can be arranged in different directions to provide overlapping fixed fields of view. The cameras 70 provide video to allow for technicians to monitor and inspect various components within the transformer 58. The cameras 70 can take on any suitable form for moving picture cameras (e.g. video camera). Any number and distribution of the cameras 70 are contemplated. In one form ROV 52 can have an array of cameras 70 distributed in one region, but in other forms the cameras 70 can be located on all sides of the ROV 52. In another form, one or more cameras 70 is a fiber-optic camera provided on a remotely controlled arm that is guided to provide a detailed inspection of transformer windings, such as a borescope.

In some embodiments, the ROV 52 is provided with lights which facilitate illumination of the area surrounding the ROV 52. In some embodiments the lights are light emitting diodes, but it will be appreciated that other illumination devices could be used. The illumination devices are oriented so as to illuminate the viewing area of one or more of the cameras 70. In some embodiments, the user can control the intensity and wavelength of the light.

The motors 72 are used to provide power to a propulsor (e.g. an impeller) which are used to control and/or provide propulsive power to the ROV 52. Each motor 72 can be reversible so as to control the flow of fluid or oil through the flow channels. Each motor can be operated independently of one another so as to control operation of an associated propulsor (e.g. a thruster pump) such that rotation of the pump in one direction causes the liquid to flow through the flow channel in a specified direction and thus assist in propelling ROV 52 in a desired direction. Other configurations of the propulsor are also contemplated beyond the form of a propeller mentioned above, such as a paddle-type pump which could alternatively and/or additionally be utilized.

In some embodiments, a single motor may be used to generate a flow of fluid through more than one channel. In other words, a housing of the ROV 52 could provide just one inlet and two or more outlets. Valves maintained within the housing could be used to control and re-direct the internal flow of the fluid and, as a result, control movement of the ROV 52 within the tank. Fluid flow from the motor can also be diverted such as through use of a rudder, or other fluid directing device, to provide the steerage necessary to manipulate the vehicle. By coordinating operation of the motors with a controller, and thus the oil flowing through the housing of the ROV 52, the ROV 52 can traverse all areas of the transformer through which it can fit. Moreover, the ROV 52 is able to maintain an orientational stability while maneuvering in the transformer 58. In other words, the ROV 52 can be stable such that it will not move end-over-end while moving within the transformer tank.

Any one of the transmitter and/or receivers 74a, 74b, and 74c can be connected to controller 76 on board the ROV 52 for the purpose of transmitting data collected from the cameras 70 and also for sending and receiving control signals for controlling the motion and/or direction of the ROV 52 within the transformer 58. The transmitter and/or receivers 74a, 74b, and 74c are structured to generate a wireless signal that can be detected by a computer or any intermediate device, such as through reception via the transmitters and/or receivers 68 (although only two are depicted in FIG. 1, it will be appreciated that another transmitter and/or receiver 68 is also used to accommodate the three separate transmitters and/or receivers 74a, 74b, and 74c in the embodiment depicted in FIG. 2).

Other aspects of an exemplary remotely operated submersible vehicle which is operated in a fluid filled transformer tank described in FIG. 1 or 2 are described in international application publication WO 2014/120568, the contents of which are incorporated herein by reference.

Referring now to FIGS. 1 and 2, transmissions from any of the pairings of transmitters and/or receiver 68 and transmitter and/or receivers 74a, 74b, and 74c can occur over a variety of manners, including various frequencies, powers, and protocols. In some applications the communication between the ROV 52 and the base station can be supplemented with a repeater or relay station, but not all embodiments need include such devices. The manners of transmission between any of transmitters and/or receivers 68 and transmitters and/or receivers 74a/74b/74c need not be identical in all embodiments. To set forth just a few examples, the transmitter and/or receiver 68 used for broadcast of signals from the base station can transmit in power that ranges from 1 W to 5 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission can also occur as TCP/IP or UDP, it can occur over WiFi radios, serial communication over Bluetooth radios, etc. In one particular form, video transmissions can occur as streaming for a Wi-Fi camera over 2.4 GHz.

In much the same manner as the transmitters and/or receivers 68 of the base station, the transmitters and/or receivers of the ROV 52 can transmit in power that ranges from 250 mW to 3 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission could be video over IP, and one embodiment of IP could be WiFi/WLAN. In one non-limiting embodiment, the transmission can therefore occur as TCP/IP or UDP, it can occur over WiFi radios, serial communication over Bluetooth radios, etc. In one particular form, video transmissions can occur as streaming for a Wi-Fi camera over 4.2 GHz. In short, a variety of transmission techniques/approaches/protocols/frequencies/etc. are contemplated herein.

The ROV 52 illustrated in FIG. 2 also includes a controller 76 which can be used to receive a command and provide a control signal to a useful component of the ROV 52. For example, the controller 76 can be used to activate one or more motors 72, cameras 70, and/or one or more additional sensors. The controller 76 can also be used to activate a ballast system, either of the emergency type or an active ballast system used to control depth under the liquid surface. The controller 76 can be comprised of digital circuitry, analog circuitry, or a hybrid combination of both of these types. Also, the controller 76 can be programmable, an integrated state machine, or a hybrid combination thereof. The controller 76 can include one or more Arithmetic Logic Units (ALUs), Central Processing Units (CPUs), memories, limiters, conditioners, filters, format converters, or the like which are not shown to preserve clarity. In one form, the controller 76 is of a programmable variety that executes algorithms and processes data in accordance with operating logic 78 that is defined by programming instructions on a non-transient computer readable medium. Alternatively or additionally, operating logic 78 for the controller 76 can be at least partially defined by hardwired logic or other hardware.

In one form, cameras 70, controller 76 with operating logic 78, and transmitters and/or receivers 74a/74b/74c, form a local positioning system 80 that provides visual and telemetry data to determine the location and orientation of the ROV 52 and, when combined with the use of a model (such as a CAD model) of the transformer 58 stored in a memory of controller 76 and/or in computer processor 54, local positioning system 80 is operable to determine an observation position of ROV 52 inside of the tank of transformer 58.

The local positioning system 80 and computer processor 54 provide robust vision-telemetry based autonomous navigation and mapping for a submersible transformer inspection robot such as ROV 52 using multi-sensory input. The navigation and mapping based on the known observation position of ROV 52 enable an effective and complete internal inspection of a transformer and generate information for a database to track transformer conditions over time. By simultaneously mapping and navigating, the user can easily track which internal portions of the transformer have been inspected and return to identified areas of concern for further investigation.

A processor of local positioning system 80 and/or computer processor 54 employs individually aligned and calibrated monocular reconstructions of video streams from a moving, rigidly linked array of N cameras 70 with overlapping FOV's in order to generate a dense global three dimensional map of the transformer 58. This map helps to generate an accurate single dynamic camera pose per frame, and to rigidly connect the relative camera poses. These camera poses and the rigid distribution of the cameras are processed to compute the observation position, such as a centroid, of the ROV 52 and therefore its global pose within transformer 58. This information is computed and updated in real-time in order to provide a real-time autonomous navigation for ROV 52 inside the transformer 58.

Figure 3:
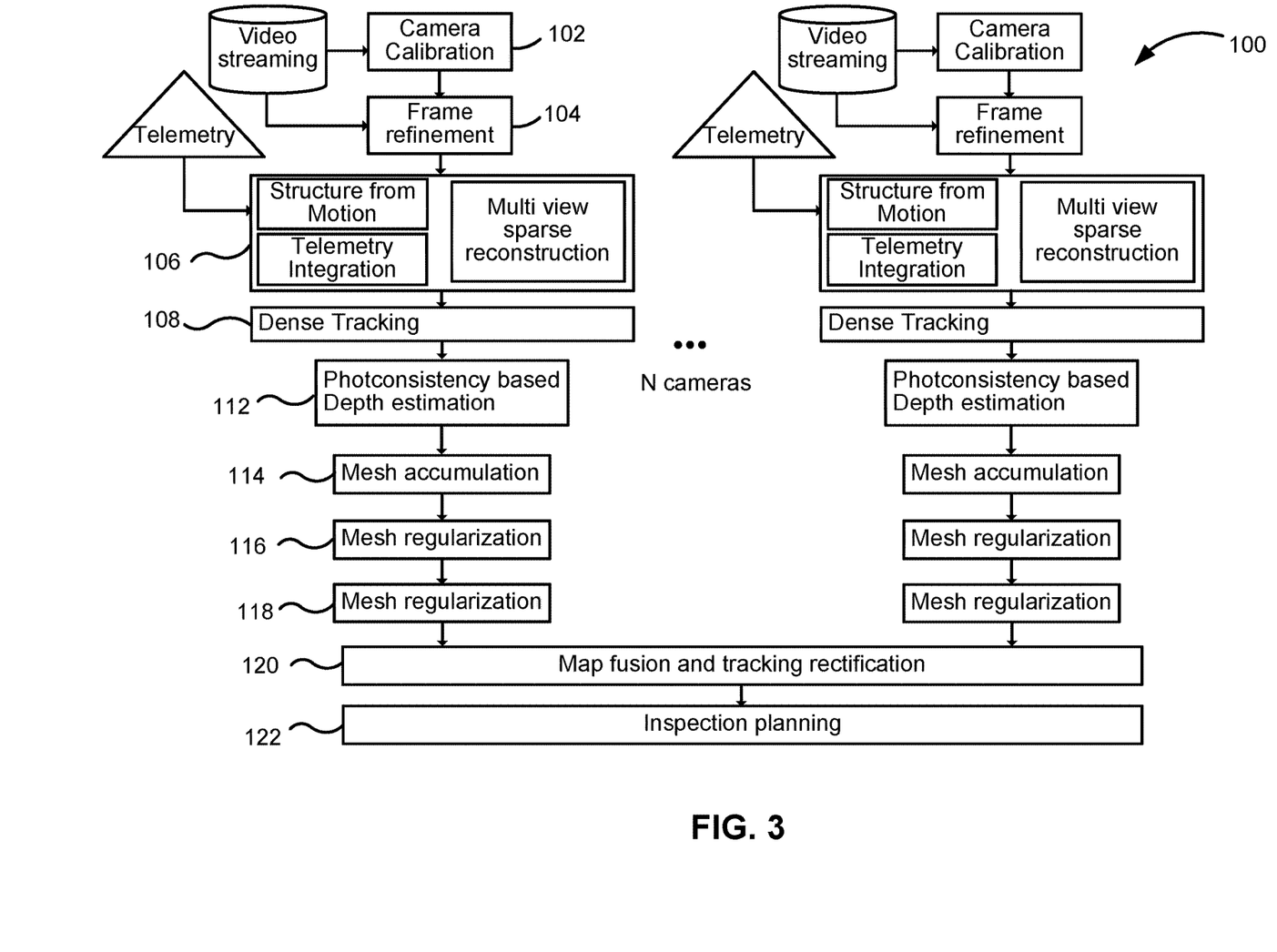
FIG. 3 depicts a schematic flow diagram for processing video streams from N-cameras to produce a three dimensional field of view for autonomous navigation and mapping by the remotely operable vehicle in a submersed environment.

Turning now to FIG. 3, one embodiment of a flow diagram of a procedure 100 for operation by a processing system of local positioning system 80 such as controller 76 and/or computer processor 54 is provided. Procedure 100 obtains information from video streams from each of the N cameras 70 mounted in the ROV 52 and telemetry data from one or more sensor in ROV 52. These video streams are broadcast to a ground station such as computer processor 54 that performs a camera calibration at operation 102. For each frame of the video stream coming from the respective camera 70, the procedure 100 also includes refining the frame by applying several filters at operation 104. Procedure 100 then includes an integration operation 106. Operation 106 includes building or obtaining a structural model of the transformer and refining the structural model by integrating telemetry data from ROV 52 to reduce the uncertainties associated with rotation and translation of the ROV 52 during navigation.

Procedure 100 continues at operation 106 by creating or updating the multi-view sparse reconstruction of the frames from the filtered frames, and then at operation 108 by using the previous information to generate a dense reconstruction and localization of the frames for dense tracking. Procedure 100 further includes an operation 112 for using photo-consistency based depth estimation to clean-up the estimated depths of the images in the frames, and an operation 114 for keeping mesh accumulation for the point clouds and an operation 116 for converting to mesh in order to regularize the structure. The regularized mesh is then used for localization and mapping of the transformer at operation 118.

These steps of procedure 100 are performed in real-time for each camera N present in the system. Moreover, in order to create a global map, the maps obtained per camera are fused and rectified in real-time at operation 120 to provide a three dimensional field of view based on the observation position of the ROV 52. After processing the frames from several of the cameras 70, the ROV 52 is ready to compute collisions and plan the motions for the transformer 58 for inspection planning at operation 122.

Figure 4:
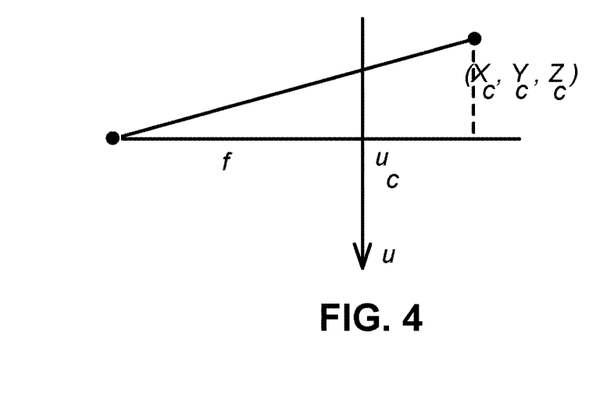
FIG. 4 depicts a representation of a projection of a three-dimensional point to a camera plane (u, v).

With respect to camera calibration operation 102 of procedure 100, multiple planar patterns and subsequently a non-linear optimization algorithm can be used to refine intrinsic parameters in order to get the global minima. For example, FIG. 4 depicts a projection of a 3D point $(X_c, Y_c, Z_c)$ to the camera plane (u, v) to find the camera parameters from known 3D points or calibration object(s). These camera parameters can be internal or intrinsic parameters such as focal length, optical center, aspect ratio and external or extrinsic (pose) parameters described by the following equations:

$$\begin{bmatrix} X_c \\ Y_c \\ Z_c \end{bmatrix} = [R]_{3\times 3} \begin{bmatrix} X \\ Y \\ Z \end{bmatrix} + t \quad \text{Equations 1 and 2}$$

$$\begin{bmatrix} u \\ v \\ 1 \end{bmatrix} \sim \begin{bmatrix} U \\ V \\ W \end{bmatrix} = \begin{bmatrix} f & 0 & u_c \\ 0 & f & v_c \\ 0 & 0 & 1 \end{bmatrix} \begin{bmatrix} X_c \\ Y_c \\ Z_c \end{bmatrix}$$

$$K = \begin{bmatrix} fa & s & u_c \\ 0 & f & v_c \\ 0 & 0 & 1 \end{bmatrix} \quad \text{Equation 3}$$

where R and t are the extrinsic parameters that describe the locations of the cameras, and K is the intrinsic calibration matrix that encloses focal length, radial distortion, non-square pixels, skew and principal point.

A calibration operation is required for the extraction of the three dimensional metric measurements from a set of frames for each camera 70 present in the ROV 52. The calibration of an under-oil optical device must take into account the effect of refraction at the air-acrylic and acrylic-oil interfaces, which are present when cameras are mounted in their housing of the ROV 52.

In one form, the refraction effect is incorporated into camera calibration parameters through implicit modelling. In this approach, the cameras 70 are calibrated in air, and then calibrated in oil to derive the geometry of the refractive interfaces, since the principal component of both refractive effect and image distortion is radial.

The intrinsic and extrinsic parameters of each camera 70 are obtained by correlating the coordinates of known points located on a calibration sample (checkerboard) with the corresponding coordinates on the image plane in both environments. The next step is to compute the extrinsic parameters of the system, relating each camera frame to a unique global coordinate system. In this way a relationship between the global coordinate system and the N-array of cameras coordinate systems is established.

Once measurements are taken in both environments, the points all together are undistorted for given projection distortion maps, and solved for $x_u$ given $x_d$ and D (generally non-invertible) as follows:

$$\underset{x_u}{\operatorname{argmin}}[(\hat{x}_d - D(x_u))^2] \quad \text{Equation 4}$$

Linearizing for Lavenberg-Marquard:

$$r_u = \sqrt{u^2 + v^2} \quad \text{Equation 5}$$

$$s_d = (1 + k_1 r_u^2 + k_2 r_u^4) \quad \text{Equation 6}$$

$$D(x_u) \approx \begin{bmatrix} u * s_d \\ v * s_d \end{bmatrix} \quad \text{Equation 7}$$

Solving for derivatives:

$$J = \begin{bmatrix} \frac{\partial(u*s_d)}{\partial u} & \frac{\partial(u*s_d)}{\partial v} \\ \frac{\partial(v*s_d)}{\partial u} & \frac{\partial(v*s_d)}{\partial v} \end{bmatrix} \quad \text{Equation 8}$$

$$\frac{\partial(u*s_d)}{\partial u} = \quad \text{Equation 9}$$
$$1 + k_1(u^2+v^2) + k_2(u^2+v^2)^2 + u*(k_1 2u + k_2 4u(u^2+v^2))$$

The calibration operation 102 allows the calibration model to use as dominant parameters the parameters from the air environment, under the assumption that these parameters have less distortion than the parameters from the oil environment. This assumption is generally true because the extrinsic parameters do not change in the calibration process (camera position related to the checkerboard) and the distortion parameters can be used to rectify the photometric variation due to lighting conditions.

Procedure 100 further includes filtering at operation 104. In one form, the filtering includes homomorphic filtering. Since the view captured in the interior of the transformer is homogeneous in color, the detection of features and shapes is difficult without filtering. Non-uniform lighting can be corrected and edges can be sharpened at the same time by enhancing the quality of each video frame through homomorphic filtering. Since an image or video frame can be considered as a function of the product of the illumination and the reflectance, a homomorphic filter can be used to correct non-uniform illumination to improve contrasts in the image.

Since the homomorphic filter amplifies the noise present in the video frame, the noise can be suppressed by applying a wavelet de-noising technique at operation 104. Multi-resolution decompositions have shown significant advantages in image or video de-noising. In one form, this de-noising filter uses nearly symmetric orthogonal wavelet bases with a bivariate shrinkage exploiting inter-scale dependency. Wavelet de-noising does not assume that the coefficients are independent, which increases the quality of the output.

Operation 104 can further include applying an anisotropic filter to the video frames. This filter is applied to smooth the image frame in a homogeneous area and preserve and enhance edges. It is used to smooth textures and reduce artifacts by deleting small edges amplified by the homomorphic filter use in the previous steps. It also removes or attenuates unwanted artifacts and remaining noise.

Operation 106 includes telemetry integration and determining structure from motion. The ROV 52 has a full six degree of freedom (DOF) pose, $x=[x, y, z, \varphi, \theta, \psi]^T$, where the pose is defined in a local-level Cartesian frame referenced with respect to the interior faces of the transformer. A pose-graph parallel localization and mapping approach can be used for state representation where the state vector, X, is comprised of a collection of historical poses.

Each node in the graph, $x_i$, corresponds to a video frame that is included in a view-based map, and these graph nodes are linked by either telemetry or camera constraints. For each node, measurements of gravity-based roll/pitch and yaw (IMU, accelerometers, etc.) are added as absolute constraints since absolute heading measurements may be unavailable due to inability to obtain a magnetically-derived compass heading near ferrous transformer walls.

Operation 106 allows the ROV 52 to localize itself with respect to the transformer environment to determine an observation position, generating at the same time a near optima sparse map. Operation 108 of procedure 100 includes dense tracking and map regularization. In order to get more complete, accurate and robust results in mapping and localizing, each element of the graph can be post-processed. The graph increases gradually while the ROV 52 navigates in the fluid environment, and post-processing of each graph element occurs for each node after is added to the graph. This post-processing can use an estimated global-robot frame transformation and the whole frame information (every pixel from the image) to perform a full dense camera tracking via whole image registration. This operation is performed for each frame in real-time and provides a high quality texture-mapped model via mesh accumulation and mesh regularization. Moreover, accurate camera localization at frame-rate is obtained by using a whole image map alignment.

Figure 5:
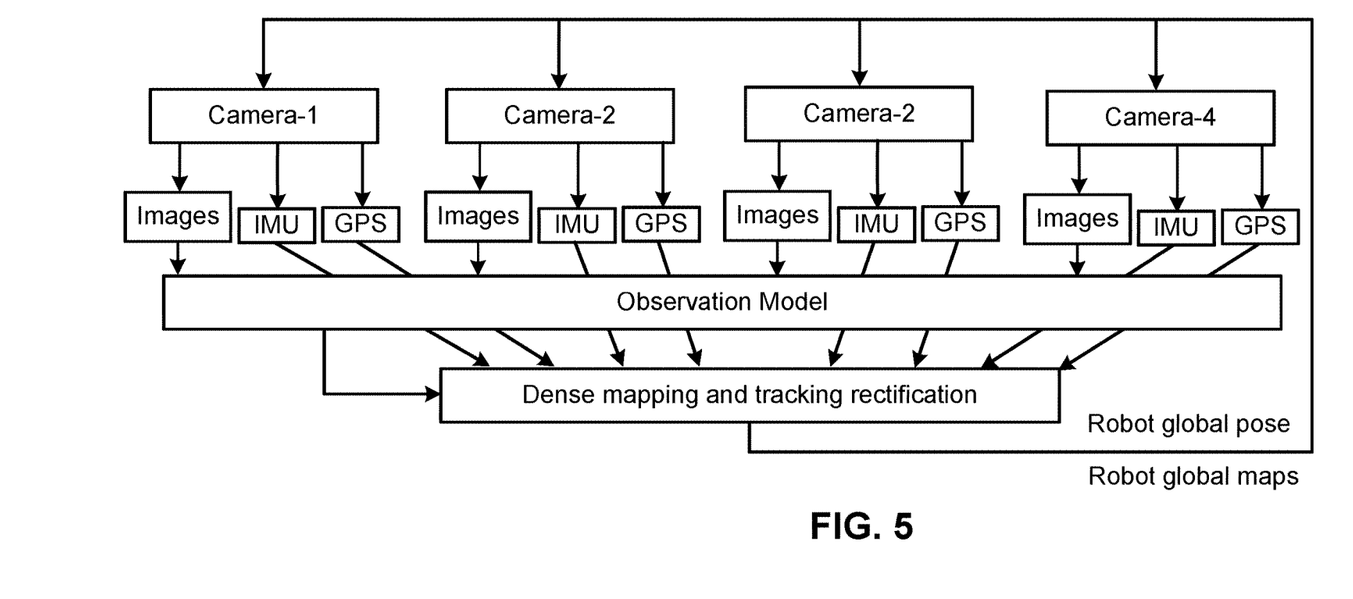
FIG. 5 depicts a schematic flow diagram for real-time dense-map fusion and tracking rectification of the video streams from the cameras.

Operation 120 of procedure 100 involves map fusion and tracking rectification. The previous operations are applied to the video streams coming from each camera 70. Therefore N dense maps and N camera graph poses are available. Since the relative camera positions are known to respect to each other due to the fixed housing for each camera inside the ROV 52, a global pose or observation position for the ROV 52 can be computed and use to globally rectify and fuse the N maps into a single map, as depicted in FIG. 5. The updates to the global map are also performed in real-time.

Figure 6:
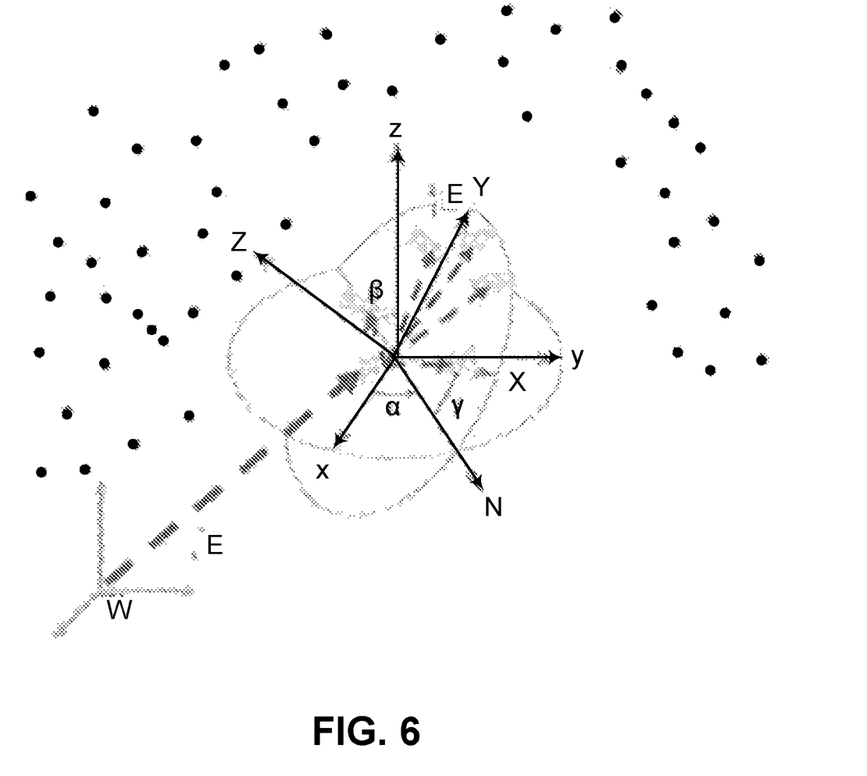
FIG. 6 depicts a system with multiple cameras facing different views to provide a quasi-spherical field of view (FOV) from an observation position of the remotely operable vehicle.

The multi-camera real-time dense mapping and localization allows the ROV 52 to have a rectified three dimensional map in real-time. In addition, by using N cameras that face different views, the robot has a quasi-spherical FOV, such as depicted in FIG. 6, that provides advantages. For example, a very large FOV increases the size of the map per time stamp. In addition, a quasi-spherical FOV provide instantaneous information about the scene inside the transformer, reducing the need for several robot motions that commonly are required to obtain multiple views in order to have an initial estimation of the scene. Also, the quasi-spherical FOV video can be displayed on a video receiver device such as display 56 to provide an immersive first person view to the user for better steering, inspection and replay experience. Moreover, the real-time dense mapping procedure 100 provides the ROV 52 the ability to detect almost instantaneously collisions in any kind of operation mode such as tele-operated or autonomous operation.

An accurate pose estimation for the observation position of the ROV 52 and a robust estimation of the surroundings inside the transformer 58 improve navigation of ROV 52. The map is used to detect collisions in the known and growing three dimensional environment, and a motion planning algorithm can be employed to assist ROV 52 in navigating between a set of given viewpoints. After the map is created, the user can define restriction zones, define the inspection locations/viewpoints, etc. to simplify the inspection process. Eventually, the user can automate the inspection. Also, multiple inspection robots can be allowed to work at the same time in different zones to improve the inspection speed.

ROV 52 can be used as a supporting technology for robotic inspection of large size transformers in order to maintain and service them. By mapping the internal structure of a transformer during each inspection, new insight into the changes of the transformer and optical properties of its oil over time can be developed. For example, changes in oil properties from the camera calibration can be observed and recorded to indicate a condition of the oil. This type of data will produce insights into transformer condition previously not possible to realize.

One mode of operation of the system 50 that can be used in whole or in part with the various embodiments described above progresses as follows: to ensure reliable communication between the ROV 52 and the computer processor 54, a transceiver 68 can be inserted into the cooling oil tank through the service opening on the top of the transformer. In certain embodiments, the transceiver 68 is used to exchange data information from a sensor(s) on the ROV 52 and the cameras 70, via a controller to the computer processor 54; and motion control or maneuvering signals from the joystick 63 via the computer processor 54 to the controller so as to operate the motors 72 and thrusters. The video and telemetry signals transmitted by the ROV 52 are used by the computer processor 54 to determine the ROV position and orientation within the tank of transformer 58.

The computer processor 54 receives the telemetry and video signals to collect data and produce a three dimensional image or video from the observation position of the ROV 52 that correlates the received signals to the model of the tank to allow a technician to monitor and control movement of the ROV 52 while oil or other fluid remains inside the transformer tank. The disclosed embodiments calibrate the multiple cameras 70 to be used in a transformer cooling fluid environment and reduce the effects of noise dominant measurements, limited FOV's, and light distortion due to the in-fluid environment.

The disclosed system 50 allows the technician to inspect the internal components of the transformer and pay particular attention to certain areas within the transformer if needed. The ROV 52 position and route through the tank is mapped, navigated and recorded so that when used in conjunction with a model of the internal parts of the transformer 58, the ROV 52 location and orientation can be determined to define the observation position of ROV 52 inside the tank.

By utilizing a model of the internal features of the transformer and the position and orientation of the ROV 52 with respect to those internal features, the video image obtained can be matched with the corresponding observation position inside the actual transformer tank. Based on the observation position and expanded FOV provided by the processing of the multiple video images from cameras 70, a technician can manipulate the joystick 63 in response to navigate through transformer 58. The computer 54 receives the movement signals from the joystick and transmits those wirelessly to the antenna 74, whereupon the controller implements internally maintained subroutines to control the pump thrusters to generate the desired movement. This movement is monitored in real-time by the technician who can re-adjust the position of the ROV 52 as appropriate.

One aspect of the present application includes an apparatus that comprises a remotely operable vehicle that is submersible. The remotely operable vehicle includes a signal receiver structured to receive a command through a liquid environment from a remote control station, a plurality of cameras fixed in position relative to one another with an overlapping field of view with each of the plurality of camera being operable to produce a video stream, and a transmitter configured to transmit the video streams to a processing device. The processing device is configured to process the video streams to output a three dimensional map based on the video streams.

In one embodiment, the processing device is a computer wirelessly connected to the remotely operable vehicle. In another embodiment, the processing device is included with a controller on the remotely operable vehicle.

In a further embodiment, the plurality of cameras are oriented on the remotely operable vehicle so the three dimensional map provides a quasi-spherical field of view.

In yet another embodiment, the processing device is configured to determine an observation position of the remotely operable vehicle in the liquid environment based on telemetry data from the remotely operable vehicle and a model of a structure that contains the liquid environment. In a further embodiment, the remotely operable vehicle includes a propulsion system with one or more motors.

In still another embodiment, the apparatus includes a base station having a signal receiver complementary to a signal transmitter of the remotely operable vehicle. The base station further includes a signal transmitter complementary to the signal receiver of the remotely operable vehicle. The remotely operable vehicle is structured to operate submerged in a tank that includes an electrical transformer submerged in an organic polymer liquid.

According to another aspect of the present application, an apparatus includes a remotely operable vehicle structured to be operated beneath the surface and within a body of liquid. The remotely operable vehicle includes a transmitter is structured to broadcast a signal with the remotely operable vehicle submerged in a liquid, and a plurality of cameras fixed in position relative to one another. Each of the plurality of cameras is structured to capture a video stream from the remotely operable vehicle within the liquid. A processor is configured to receive and process the video streams to determine an observation position of the remotely operable vehicle within the liquid and output a three dimensional field of view based on the video streams and the observation position.

In one embodiment, the processing device is at least one of a computer wirelessly connected to the remotely operable vehicle and a controller on the remotely operable vehicle. In another embodiment, the plurality of cameras are oriented on the remotely operable vehicle to provide a quasi-spherical field of view.

In yet another embodiment, the processing device is configured to determine the observation position of the remotely operable vehicle in the liquid environment based on telemetry data from the remotely operable vehicle and a model of a structure containing the liquid environment.

According to another aspect, a method includes: inserting a submersible, remotely operable vehicle into an interior of a transformer tank that includes an electrical transformer submerged in a liquid coolant; propelling the remotely operable vehicle through the liquid coolant in the transformer tank to inspect the electrical transformer; operating a plurality of cameras fixed on the remotely operable vehicle to produce video streams of the interior of the transformer tank; determining an observation position of the remotely operable vehicle based on telemetry data and a model of the electrical transformer; and processing the video streams from each of the plurality of cameras to output a three dimensional field of view of the interior of the transformer tank and the electrical transformer from the observation position of the remotely operable vehicle.

In one embodiment, the method includes updating the observation position and the three dimensional field of view in real time while the remotely operable vehicle is propelled through the liquid coolant.

In another embodiment, the method includes calibrating each of the plurality of cameras for operation in the liquid coolant before determining the observation position. In a refinement of this embodiment, calibrating each of the cameras includes first calibrating each of the plurality of cameras in air and then calibrating each of the plurality of cameras in the liquid coolant.

In yet another embodiment, the method includes filtering frames of each of the video streams from each of the plurality of cameras. In a further embodiment, determining the observation position includes referencing a pose of the remotely operable vehicle with respect to interior faces of the transformer tank.

In still another embodiment, the method includes mapping the electrical transformer based on the three dimensional field of view. In a further embodiment of the method, the plurality of cameras are arranged to provide a quasi-spherical three dimensional field of view. In another embodiment, the method includes displaying the three dimensional field of view on a display.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method comprising:
   inserting a submersible, remotely operable vehicle into an interior of a transformer tank that includes an electrical transformer submerged in a liquid coolant;
   receiving, by the submersible, remotely operable vehicle, a command transmitted through the liquid coolant from a remote control station;
   propelling, based on the command, the remotely operable vehicle through the liquid coolant in the transformer tank to inspect the electrical transformer;
   operating a plurality of cameras fixed in position relative to one another with an overlapping field of view on the remotely operable vehicle, each of the plurality of cameras being within the submersible, remotely operable vehicle and being operable to produce video streams of the interior of the transformer tank;
   determining an observation position of the remotely operable vehicle based on telemetry data from one or more sensors in the remotely operable vehicle and a model of the electrical transformer;
   processing the video streams from each of the plurality of cameras to output a three dimensional field of view of the interior of the transformer tank and the electrical transformer from the observation position of the remotely operable vehicle, wherein processing the video streams includes filtering frames of each of the video streams from each of the plurality of cameras; and
   updating the observation position and the three dimensional field of view in real time while the remotely operable vehicle is propelled through the liquid coolant.

2. The method of claim 1, further comprising calibrating each of the plurality of cameras for operation in the liquid coolant before determining the observation position.

3. The method of claim 2, wherein calibrating each of the cameras includes first calibrating each of the plurality of cameras in air and then calibrating each of the plurality of cameras in the liquid coolant.

4. The method of claim 1, wherein determining the observation position includes referencing a pose of the remotely operable vehicle with respect to interior faces of the transformer tank.

5. The method of claim 1, further comprising mapping the electrical transformer based on the three dimensional field of view.

6. The method of claim 1, wherein the plurality of cameras is arranged to provide a quasi-spherical three dimensional field of view.

7. The method of claim 1, further comprising displaying the three dimensional field of view on a display.

8. A submersible, remotely operable vehicle that is submersible, the remotely operable vehicle adapted to be inserted into an interior of a transformer tank that includes an electrical transformer submerged in a liquid coolant, the remotely operable vehicle including:
   a signal receiver structured to receive a plurality of commands through a liquid environment from a remote control station, the plurality of commands including a command for propelling the remotely operable vehicle through the liquid coolant in the transformer tank for inspection of the electrical transformer and a command for operation of a plurality of cameras;
   the plurality of cameras fixed in position relative to one another with an overlapping field of view, each of the plurality of cameras being within the submersible, remotely operable vehicle and being operable to produce a video stream, thereby producing a plurality of video streams; and a transmitter configured to transmit the plurality of video streams to a processing device, the processing device being configured to determine an observation position of the remotely operable vehicle based on telemetry data from one or more sensors in the remotely operable vehicle and a model of the electrical transformer and to process the plurality of video streams to output a three dimensional field of view of the interior of the transformer tank and the electrical transformer from the observation position of the remotely operable vehicle and update the observation position and the three dimensional field of view in real time while the remotely operable vehicle is propelled through the liquid coolant, wherein processing the plurality of video streams includes filtering frames of each video stream from each of the plurality of cameras.

9. The remotely operable vehicle of claim 8, wherein the plurality of cameras is oriented on the remotely operable vehicle so the three dimensional map provides a quasi-spherical field of view.

10. The apparatus of claim 8, wherein the processing device is configured to determine the observation position of the remotely operable vehicle in the liquid environment based on telemetry data from the remotely operable vehicle and a model of a structure that contains the liquid environment.

11. The apparatus of claim 8, wherein the remotely operable vehicle includes a propulsion system with one or more motors.

* * * * *